United States Patent
Bergere

(10) Patent No.: US 9,485,902 B2
(45) Date of Patent: Nov. 8, 2016

(54) DEVICE FOR DISPENSING SEEDS SINGLY

(71) Applicant: Ribouleau Monosem, Largeasse (FR)

(72) Inventor: Caroline Bergere, Bressuire (FR)

(73) Assignee: RIBOULEAU MONOSEM, Largeasse (FR)

( * ) Notice: Subject to any disclaimer, the term of this patent is extended or adjusted under 35 U.S.C. 154(b) by 168 days.

(21) Appl. No.: 14/295,995

(22) Filed: Jun. 4, 2014

(65) Prior Publication Data

US 2014/0352588 A1 Dec. 4, 2014

(30) Foreign Application Priority Data

Jun. 4, 2013 (FR) ...................................... 13 55138
May 27, 2014 (EP) ...................................... 14170080

(51) Int. Cl.
*A01C 7/04* (2006.01)

(52) U.S. Cl.
CPC ..................................... *A01C 7/046* (2013.01)

(58) Field of Classification Search
CPC ...... A01C 7/046; A01C 7/044; A01C 7/042; A01C 7/04; A01C 7/00
See application file for complete search history.

(56) References Cited

U.S. PATENT DOCUMENTS

2008/0308605 A1* 12/2008 Scirica ............ A61B 17/07207
227/175.1

FOREIGN PATENT DOCUMENTS

| EP | 0141638 A2 | 10/1984 |
|----|------------|---------|
| WO | 9602123 A1 | 2/1996 |
| WO | 2012121658 A1 | 9/2012 |

OTHER PUBLICATIONS

French Search Report and Written Opinion dated Mar. 11, 2014 for corresponding French Patent Application No. FR1355138, filed Jun. 4, 2013.
English translation of the French Written Opinion dated Mar. 11, 2014 for corresponding French Patent Application No. FR1355138, filed Jun. 4, 2013.

* cited by examiner

*Primary Examiner* — Christopher J Novosad
(74) *Attorney, Agent, or Firm* — David D. Brush; Westman, Champlin & Koehler, P.A.

(57) ABSTRACT

A device is provided for dispensing seeds singly. The device includes a drum, a dispensing disc, a vacuum chamber and a seal of the vacuum chamber, between the drum and the disc. The seal includes a friction insert mounted so as to be immobile in rotation relative to the drum against the periphery of the disc and an elastic seal mounted so as to be immobile in rotation between the drum and the friction insert. The elastic seal maintains the friction insert in a position of leaning against the disc.

10 Claims, 4 Drawing Sheets

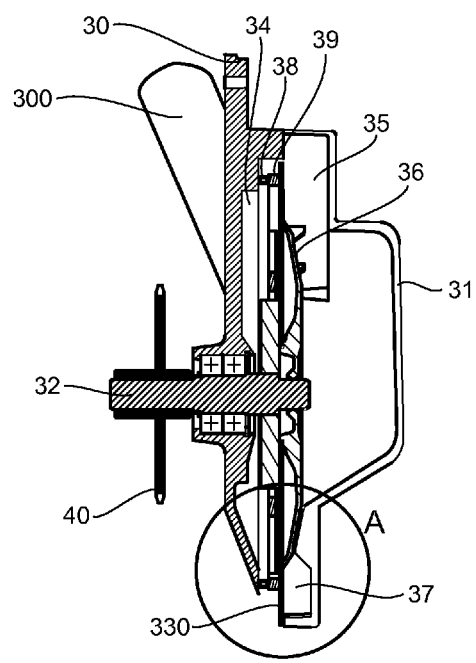
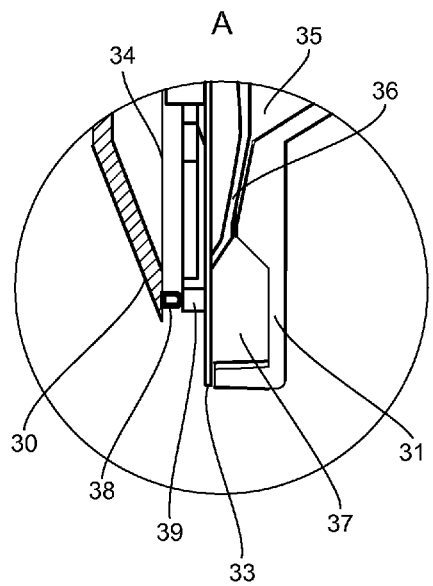
Fig. 3
Fig. 4
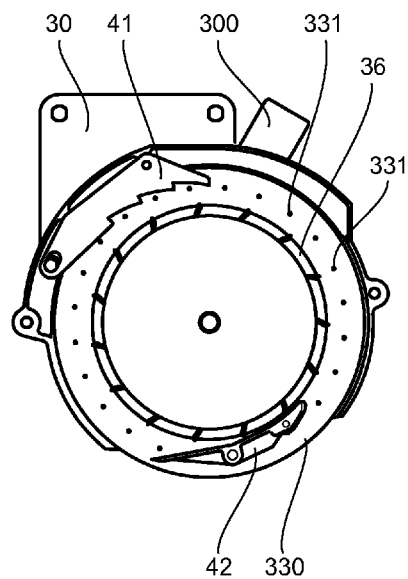
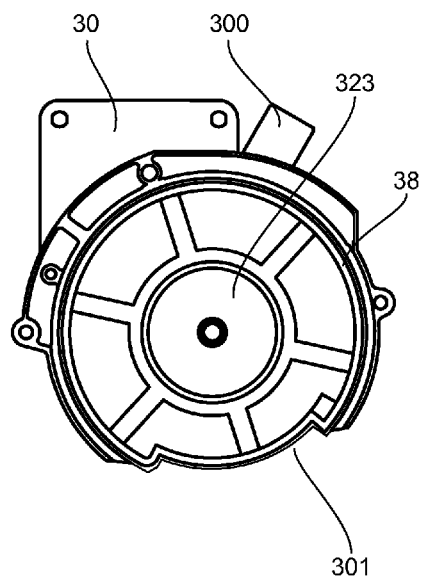
Fig. 5
Fig. 6

DEVICE FOR DISPENSING SEEDS SINGLY

1. FIELD OF THE INVENTION

The field of the invention is that of the designing and making of single-seed vacuum planters.

More specifically, the invention pertains to a vacuum-type device for dispensing seeds one by one or singly.

2. PRIOR ART

Vacuum-type single-seed planters 10, such as the one illustrated in FIG. 1, are classically used by agriculturists to seed the surfaces that they cultivate.

The planters generally comprise a frame 12 carried by wheels 13 and meant to be towed or borne by an agricultural machine such as a tractor. They generally comprise several planting elements 11 fixedly attached side by side to the frame 12.

Each planting element 11 generally comprises a mount 14 that rests on the ground by means of a pair of gauge wheels 15 between which a pair of disc openers 16 is placed. A rear unit 17, often comprising two tilted wheels, is fixedly attached to the rear of the mount 14. The disc openers cut out a furrow in the ground when the planter is moved over its surface. The gauge wheels make it possible to adjust the depth of the furrow according to their position. The rear unit is used to close the furrow after the seeds have been deposited therein. Each planting element 11 also has a seed-storage means 18, the outlet of which communicates with a device 19 for dispensing seeds singly (i.e. one by one).

The devices for dispensing seeds singly include seed-dispensing fixed-box type pneumatic vacuum devices.

The present invention very particularly pertains to seed dispensers of this type.

Such a device for dispensing seeds singly comprises, classically, a box that is to be fixedly attached to a planting element.

This box comprises a drum and a lid, that are fixed relative to each other and that together define an interior cavity.

A drive shaft is mounted so as to be in a rotationally mobile through the drum. A first end of the drive shaft extends to the exterior of the drum while a second end of the drive shaft extends into the interior of the cavity.

A dispensing disc, traversed by a plurality of grain suction holes made evenly on its periphery, is mounted so as to be fixedly attached in rotation to the drive shaft inside the cavity. Therein, with the drum and the lid, it demarcates a vacuum chamber and a seed reservoir. The drum has an orifice for putting the vacuum chamber into vacuum. This drum is to be connected with a device for creating a vacuum, for example a turbine 20.

The shape of the drum is chosen in such a way that a portion of the zone of the disc that is crossed by holes extends out of the vacuum chamber. A part of the disc is thus exempt from the vacuum in rotating, thus allowing the seeds to fall into the furrow.

The dispensing of seeds singly is obtained as follows.

While the planter is being moved on the surface of the ground, the drive shaft is driven rotationally via driving means planned for this purpose. The dispensing disc is then driven rotationally. At the same time, the turbine is put into action to generate a vacuum inside the vacuum chamber. Seeds are conveyed from the seed storage means into the reservoir. Because of the vacuum prevailing inside the vacuum chamber, the seeds contained in this reservoir are sucked in and get positioned one by one in the suction holes of the dispensing disc which is facing the vacuum chamber. It must be noted that the disc is provided with a stirrer, consisting of a separate part to which the disc is fixed and which plays the role, on the one hand, of rigidifying the disc and on the other hand of shaking and shuffling the seeds with its fins, thus enabling the seeds to be better secured in the holes. Selection means can be used, if necessary, to ensure that each hole traps only one seed. As and when the dispensing disc rotates, the suction holes in each of which a seed is placed extend outside the vacuum chamber. The seed then is no longer kept inside the hole and falls from the disc in order to be conveyed into the furrow which has been opened out beforehand.

Given the spacing with which the holes are dispensed on the disc and the speed of the movement of the planter, the seeds are deposited singly and at regular intervals in the furrow.

3. DRAWBACKS OF THE PRIOR ART

In order to ensure an efficient dispensing of seeds singly, tight-sealing means are used to ensure the tight sealing of the vacuum chamber.

In a first technique, the tight sealing of the vacuum chamber is obtained by the application of the dispensing disc against the periphery of the drum. Thus, when a suction is created in the vacuum chamber to generate a vacuum therein, the disc is held by the vacuum against the drum and thus ensures the tight sealing of the vacuum chamber.

This solution ensures efficient sealing of the vacuum chamber. However, it raises some problems. Especially, when the dispensing disc is driven rotationally, it rubs against the drum. The force of friction between the disc and the drum then makes it necessary to transmit relatively high driving torque to the drive shaft so that the dispensing disc can be put into motion. This increases energy consumption and makes it necessary to oversize the shaft drive means. This is not satisfactory. In addition, the rubbing of the disc against the drum causes premature wear and tear of these elements and enforces regular and sometimes cumbersome maintenance campaigns (for example for replacing the drum, the disc and/or the worn-out parts).

In a second technique, the tight sealing of the vacuum chamber is obtained by interposing a seal between the dispensing disc and the periphery of the drum. This seal is attached to the drum and is therefore fixed. Thus, when suction is created in the vacuum chamber to generate vacuum therein, the disc gets applied against this seal to ensure the tight sealing of the vacuum chamber.

This approach also ensures efficient sealing of the vacuum chamber. It also plays a part in removing the problem of premature wear and tear of the drum and of the disc inherent in the first approach discussed here above. However, because the disc rubs against the seal, the seal undergoes wear and tear that can occur very rapidly, making it necessary carry out frequent and therefore costly maintenance campaigns.

In a third technique, the tight sealing of the vacuum chamber is obtained by providing for a very small clearance between the dispensing disc and the periphery of the drum. Thus, the tight sealing of the vacuum chamber is ensured without having the dispensing disc lean against the drum.

This approach also provides for efficient tight sealing of the vacuum chamber while removing the problem of premature wear and tear of both the drum and the disc inherent in the first approach as well as the problem of rapid wear and tear of the seal in the second approach. However, a clearance between the disc and the drum that is small enough to ensure the tight sealing of the vacuum chamber while at the same time preventing any contact between the disc and the drum necessitates compliance with the design rules of precision mechanics. The result of this is that the dispensing devices according this third approach prove to be difficult and therefore costly to manufacture.

In order to reduce the problems of wear and tear referred to here above, the friction between the disc and the drum or the seal by can be reduced by diminishing the compressive force that the parts placed in contact with each other exert on each other. This would be done however to the detriment of the tight sealing of the vacuum chamber. The suction of the seeds from the reservoir to the holes of the disc as well as their release at the time of their ejection towards the ground would then not be optimal. The quality of the seed dispensing operation would then be diminished.

4. SUMMARY OF THE INVENTION

An aspect of the present disclosure relates to a device for dispensing seeds singly, said device comprising:
- a drum to be fixedly attached to a planter;
- a lid that is fixed relative to said drum and defines an internal cavity with said drum;
- a drive shaft mounted so as to be rotationally mobile through said drum;
- a dispensing disc traversed by a plurality of seed suction holes made evenly on the periphery of said disc, said disc being mounted so as to be fixedly attached in rotation on said shaft inside said cavity so that, with said drum and said lid, it demarcates a vacuum chamber and a seed reservoir therein, a portion of the zone of said disc traversed by said holes extending outside said vacuum chamber;
- means to provide the tight sealing of the vacuum chamber between said drum and said disc;

said means to provide tight sealing comprising a friction insert mounted so as to be immobile in rotation relative to said drum against the periphery of said disc and an elastic seal mounted so as to be immobile in rotation between said drum and said friction insert, said elastic seal maintaining said friction insert in a position of leaning against said disc.

Thus, the invention relies on a wholly original approach which consists in ensuring the tight sealing of the vacuum chamber of a fixed-box type device for dispensing seeds singly by interposing, between the dispensing disc and the drum, an elastic seal and a friction insert fixed relative to the drum, the seal leaning against the drum and the friction insert and the friction insert leaning against the dispensing disc, the elastic seal maintaining the friction insert so that it leans against the dispensing disc because of its elasticity.

Through the application of this architecture, the dispensing disc rubs neither against the seal nor against the drum during the operation of the dispensing. On the contrary, it rubs, with a controlled friction torque, against a wearing part, in this case the friction insert, provided for this purpose. Thus, problems of premature wear and tear are avoided and the maintenance campaigns are limited accordingly. The maintenance operations are furthermore facilitated because they are limited essentially to the replacement of the friction insert which, as has just been indicated, is a wearing part.

It is the properties of elasticity of the seal that are used to maintain the friction insert against the disc, the friction force between the disc and the insert being then under full control. Thus, the suction generated in the vacuum chamber is no longer used to ensure tight sealing as is the case in certain prior-art solutions. Thus this friction force is fully mastered so much so that it is possible to limit wear and tear, reduce the size of the shaft drive means and reduce energy consumption.

According to a preferred characteristic, said seal has a stiffness such that it exerts a force on said friction insert ranging from 10N to 100N per linear meter for compression travel of one millimeter for the seal.

A seal having such elasticity enables the exertion of a force for holding the friction insert in a position of leaning against the disc at a level precisely needed to ensure excellent sealing of the vacuum chamber without in any way thereby inducing a major friction force between the disc and the friction insert. It is then possible to achieve satisfactory dispensing of seeds and limit energy consumption.

According to a preferred characteristic, said friction insert comprises an external peripheral portion in contact with said seal and an internal peripheral portion, said external peripheral portion being capable of getting axially deformed relative to said internal peripheral portion.

Thus, under the effect of the elasticity of the seal, the external peripheral portion of the friction insert gets deformed to get applied against the dispensing disc. Thus, the sealing of the vacuum chamber is further improved. At the same time, there is better control over the friction force between the disc and the friction insert.

According to a preferred characteristic, said shaft comprises a shoulder situated inside said vacuum chamber, said disc leaning against said shoulder.

The dispensing disc is thus maintained efficiently in position, including when a vacuum is generated in the vacuum chamber. The sealing is therefore linked only to the force that the seal exerts on the insert and not to a force that would be exerted by the disc on the insert during the vacuum. This also enables better control of the friction force between the disc and the insert and makes it possible especially to reduce it.

According to a preferred characteristic, said friction insert is made out of a material with a low coefficient of friction, for example bronze or a plastic material with a coating of Teflon®, among others.

Thus, friction between the disc and the insert is reduced without impairing the tight sealing of the vacuum chamber.

According to one preferred characteristic, said seal belongs to the group comprising at least:
- lip seals;
- hollow seals;
- solid seals.

According to a preferred characteristic, said seal is fixedly attached to said drum.

Thus, the efficient holding of the seal in position is ensured.

According to a preferred characteristic, said seal is fixedly attached to said friction insert.

In this case, said seal is preferably fixedly attached to said friction insert by gluing, overmolding or being clipped into a groove of complementary shape made in said friction insert.

The operator in charge of maintenance then has to dismantle only the friction insert that carries the seal to replace the used insert/seal assembly with a new one rather than dismantle it and replace, on the one hand, the friction insert and, on the other hand, the seal. Maintenance is thus simplified.

The invention also pertains to a planting element comprising a dispensing device according to any one of the variants explained here above.

The invention discussed also pertains to a planter comprising at least one planting element of this kind.

5. LIST OF FIGURES

Other features and advantages of the invention shall appear more clearly from the following description of a preferred embodiment given by way of a simple illustratory and non-exhaustive example and from the appended figures, of which:

FIG. 3 illustrates a cross-section view of the device of FIG. 2;

FIG. 4 illustrates a detailed view of FIG. 3;

FIG. 5 illustrates a side view of the device of FIG. 3 without the lid;

FIG. 6 illustrates a side view of the interior of the drum of the device of FIG. 3;

Figure 1:
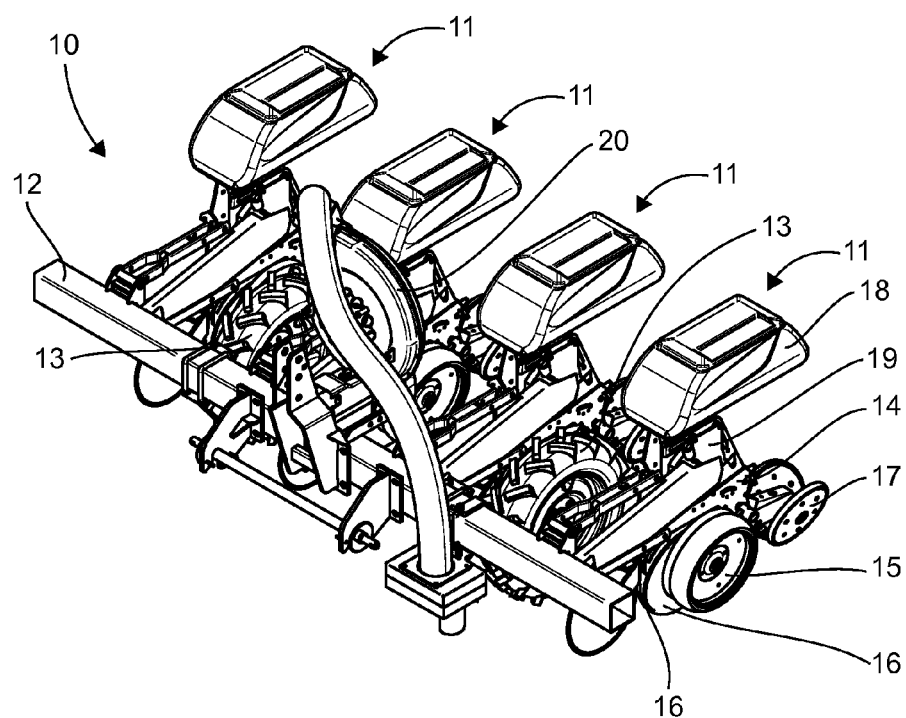
FIG. 1 illustrates a view in perspective of a planter.
Figure 2:
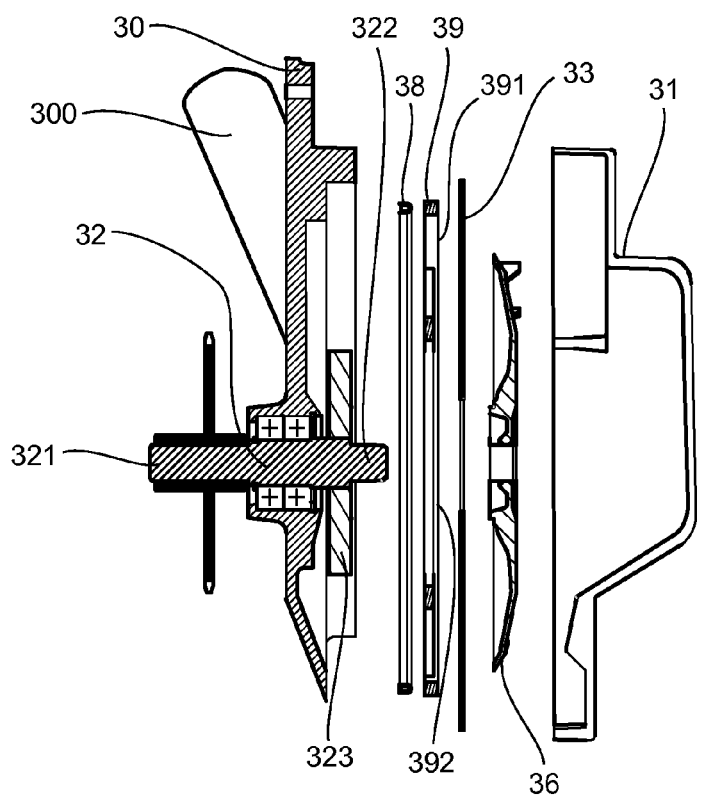
FIG. 2 illustrates an exploded view of a device for dispensing seeds according to the invention.

6. DESCRIPTION OF ONE EMBODIMENT OF THE INVENTION 6.1. Structure

Referring to FIGS. 2 to 11, we present an example of a dispensing device (or dispenser) for dispensing seeds singly according to the invention.

A device of this kind for dispensing seeds singly comprises a box that is to be fixedly attached to a planting element.

This casing comprises a drum 30 and a lid 31 attached to each other and together defining an inner cavity.

A drive shaft 32 is mounted so as to be rotationally mobile through the drum 30. A first end 321 of the drive shaft 32 extends to the exterior of the drum 30 while a second end 322 of the drive shaft 32 extends into the interior of the cavity.

A dispenser disc 33 traversed by a plurality of seed-suction holes 331 made evenly on its periphery is mounted so as to be fixedly attached in rotation to the drive shaft 32 inside the cavity. Therein, with the drum 30 and the lid 31, it demarcates a vacuum chamber 34 and a seed reservoir 35.

The drive shaft 32 comprises a shoulder 323 which extends into the interior of the dispensing chamber 34. This shoulder 323 can be directly formed in the shaft 32 or else added to it.

The dispensing disc 33 is placed flat against the shoulder 323.

The drum 30 has a hole 300 for putting the vacuum chamber 34 under vacuum, this vacuum chamber 34 being intended for being connected with a device to set up a vacuum such as a turbine (not shown).

The shape of the drum 30 is chosen so that a portion 330 of the zone of the disc 33 that is traversed by the holes 331 extends outside the vacuum chamber 34.

The shape of the drum 30 thus has a recessed feature 301.

A stifling disc with blades 36 is mounted so as to be fixedly attached in rotation to the shaft inside the reservoir 35.

In another embodiment, the blades could be soldered or molded directly on the dispensing disc 33, provided that the disc is sufficiently rigid.

The dispensing disc 33 does not get deformed, since it is rigid enough in itself and/or rigid enough because of the blade-fitted stirrer disc 36. Thus, it cannot get deformed under the effect of the vacuum that is likely to be created in the vacuum chamber 34.

The lid 31 with the disc 3 defines a zone 37 for ejecting seeds.

The device comprises tight-sealing means to provide tight sealing for the vacuum chamber 34.

These tight-sealing means comprise an elastic seal 38 and a friction insert 39.

Figures 7, 8:
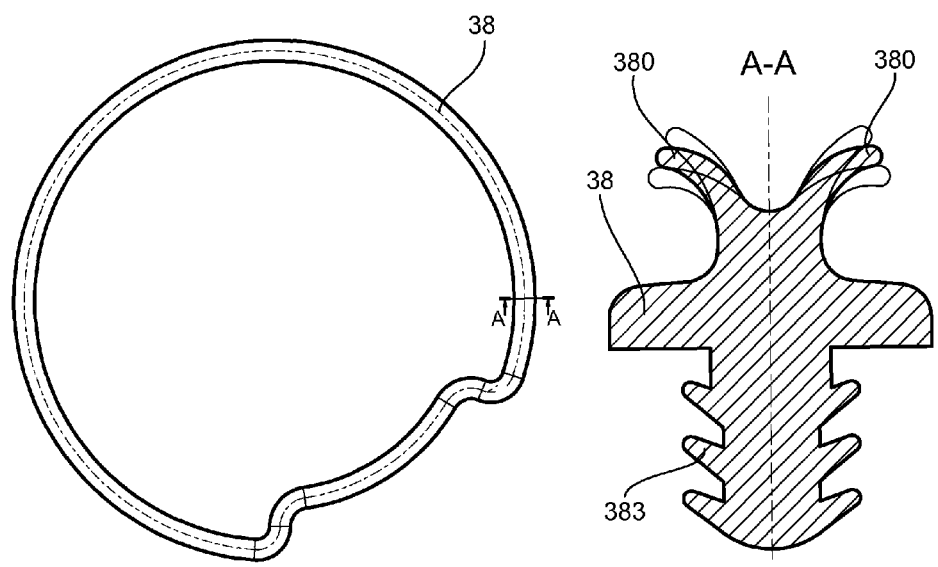
FIGS. 7, 8, 9 and 10 illustrate the seals of a device according to the invention.
Figures 9, 10:
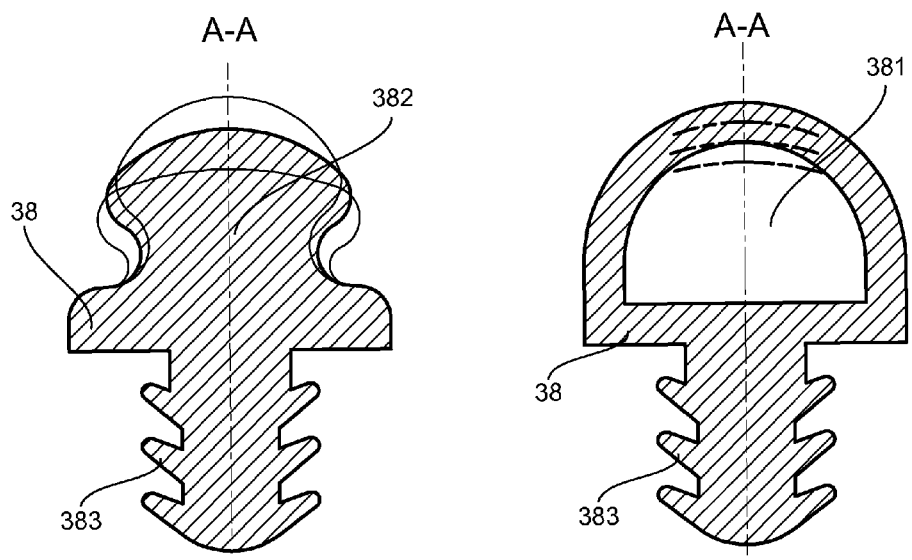
Figure 11:
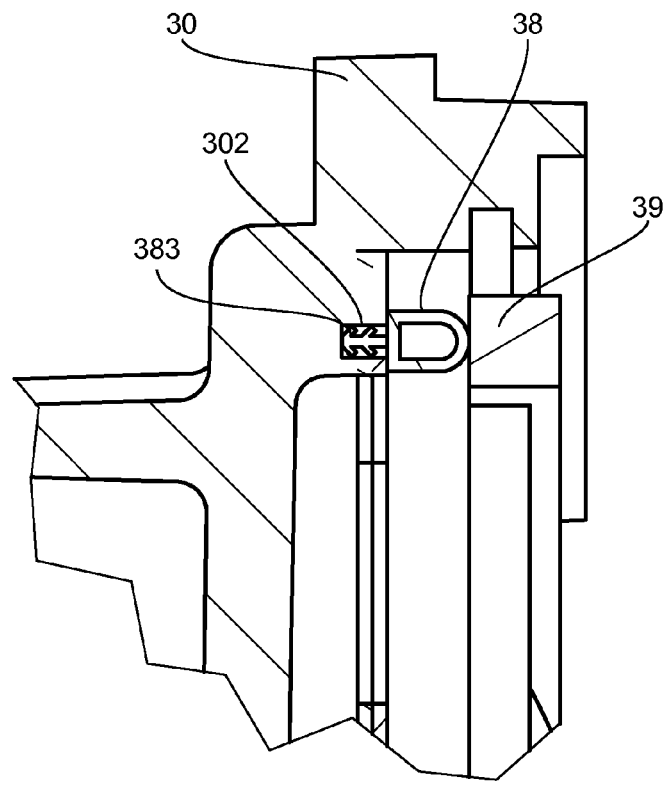
FIG. 11 illustrates a partial view in cross-section of the seed dispenser of FIG. 3.

The elastic seal 38 is fixed relative to the drum 30. In this embodiment, it is fixedly attached to the interior of a groove 302 made for this purpose in the peripheral outline of the drum 30 demarcating the vacuum chamber 34. The seal 38 comprises a fixed attachment portion 383 designed to be force-fitted in the groove 302. It could for example be:

a seal 380 having one or more lips, such as the one illustrated in FIG. 8;

a solid-core seal 382, such as the one illustrated in FIG. 9;

a hollow-core seal 381, such as the one illustrated in FIG. 10.

This joint will preferably be made out of a plastic such as an elastomer.

The friction insert 39 is mounted so as to be fixed relative to the drum 30. It could for example be attached thereto, preferably at its center, by means of screws or the like. It is interposed between the seal 38 and the dispensing disc 33. Its shape is defined so that it does not obstruct the suction holes 331 of the disc 33.

The friction insert 39 comprises an external peripheral portion 391 in contact with the seal 38 and an internal peripheral portion 392. The insert has a certain degree of elasticity so that the external peripheral portion can get axially deformed relative to the internal peripheral portion 392 so as to be placed flat against the disc 33 under the force of the seal 38.

Indeed, the external peripheral portion 391 is connected to the internal peripheral portion 392 by radius to give flexibility to the external peripheral portion 391. The internal peripheral portion can be fixed to the casing by attachment means such as screws or rotation stops or the like, the attachment being done so that the internal peripheral portion 392 does not rotate with the disc.

The friction insert 39 is made out of a material with a low friction coefficient. It could for example be a plastic material, for example coated with Teflon®.

The elastic seal 38 preferably has a stiffness such that it exerts a force on the friction insert ranging from 10N to 100N per linear meter for compression travel of one millimeter.

Owing to its elasticity, the elastic seal 38 maintains the friction insert so that it leans against the dispensing disc 33.

Such a dispensing disc can be implemented in a planting element such as those illustrated in FIG. 1. Such a planting element can be implemented in a planter such as the one illustrated in FIG. 1.

6.2. Operation

The dispensing of seeds singly is obtained as follows.

While the planter is being moved on the surface of the ground, the drive shaft 32 is driven rotationally via drive means provided for this purpose. The drive shaft 32 could for example carry a ring 40 linked by a chain with a shaft of a motor or a motor shaft (not shown). The dispensing disc 33 is then driven rotationally in proportion to the forward feed speed of the planter.

At the same time, the turbine 20 is used to generate a vacuum inside the vacuum chamber 34. Seeds are conveyed from the seed storage means of the planting element into the reservoir 35. Because of the vacuum prevailing inside the vacuum chamber 34, the seeds contained in the reservoir 35 are sucked up and get positioned one by one in the suction holes 331 of the dispensing disc 33 facing the vacuum chamber 34.

Means for selecting 41, known per se, can if necessary be implemented to make sure that each hole 331 traps only one seed.

As and when the dispensing disc 33 rotates, the suction holes 331, in each of which a seed is positioned, extend out of the vacuum chamber 34 (portion 330). The seed is then no longer held in the hole 331 and falls from the disc 33 into the ejection zone 37 in order to be conveyed into the furrow that has been dug out beforehand. Means for assisting in ejection 42, known per se, can also be implemented.

Given the ratio of speeds between the feed speed of the planter and the rotation speed of the disc and given the pitch at which the holes are dispensed on the disc, the seeds are deposited one by one in the furrow at regular intervals.

Owing to its stiffness and its association with a stirrer, the dispensing disc 33 does not get deformed under the effect of the vacuum inside the vacuum chamber 34. It is therefore not placed flat against the friction insert, and this limits friction.

Owing to its elasticity, the seal 38 imprints a force on the friction insert 39 that tends to flatten and hold this insert against the disc 33. Thus, perfect tight sealing of the vacuum chamber is ensured without in any way generating a major friction force between the friction insert 39 and the dispensing disc 33. This level of friction depends on the stiffness of the seal 38. The stiffness of the seal is therefore chosen so that the tight sealing of the vacuum chamber is ensured by generating the lowest possible friction between the disc and the insert.

The technique of the invention thus provides for perfect tight sealing of the vacuum chamber and therefore an optimized dispensing of the seeds while at the same time limiting the size of the drive means implemented to activate the dispenser and reducing the frequency of the maintenance campaigns.

6.3. Variant

Figure 12:
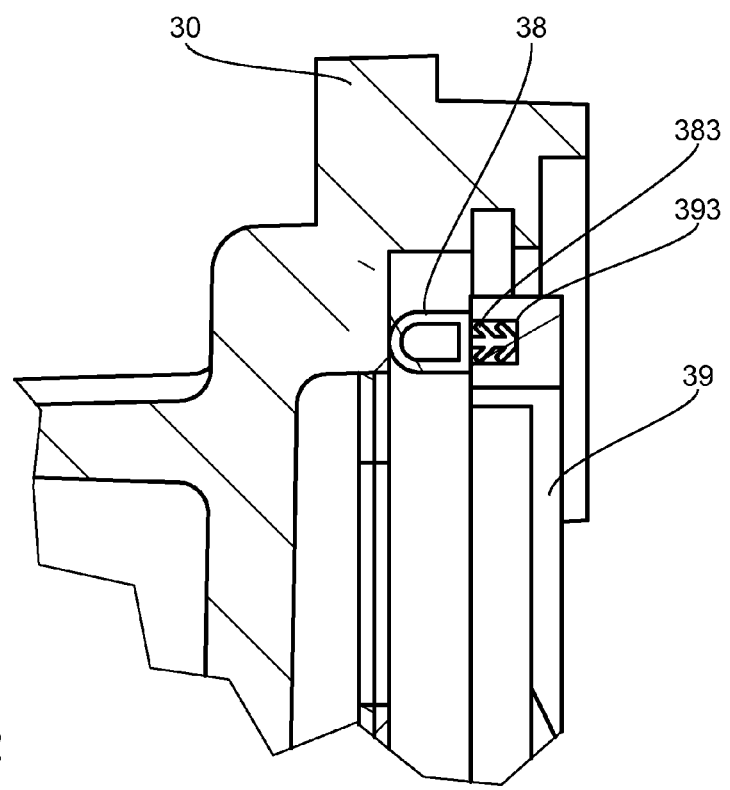
FIG. 12 illustrates a partial view in cross-section of a variant of a seed dispenser according to the invention.

FIG. 12 illustrates a partial view in cross-section of a variant of a seed dispenser according to the invention.

The structure of the seed dispenser in this variant is identical to that of the seed dispenser according to the embodiment that has just been described except that the seal 38 is no longer fixedly attached to the drum 30. It is on the contrary fixedly attached to the friction insert 39.

In the embodiment of FIG. 12, the seal 38 is clipped into a groove 393 made for this purpose in the friction insert 39. The seal 38 preferably comprises an attachment portion 383 designed to be force-fitted into the groove 393.

In variants, the seal 38 could be fixedly attached to the friction insert 39 by gluing, overmolding or any other appropriate attachment technique.

The implementing of this embodiment facilitates the maintenance of the seed dispenser. Indeed, the operator in charge of the maintenance has to dismantle only the friction insert which carries the seal to replace the used insert/seal assembly by a new one rather than dismantle and replace, on the one hand, the friction insert and, on the other hand, the seal.

Owing to its elasticity, the seal 38 leaning against the drum 30 acts against the friction insert 39 to place it flat against the disc 33 with a precise level of friction needed to ensure the tight sealing of the vacuum chamber 34. Thus, wear and tear and the frequency of the maintenance campaigns are limited while at the same time providing for efficient sealing of the vacuum chamber and therefore an optimum dispensing of the seeds.

In a variant, the friction insert would not be fixedly attached to the drum. On the contrary, it would be fixed to be floating relative to the drum so as to be fixedly attached in rotation to the drum but to be able to move relative to it along its longitudinal axis. The friction insert would be crossed by longitudinal holes and the drum would have pins extending along axis that are parallel to its longitudinal axis. These pins would be inserted inside the holes of the friction insert to stop it in rotation but not in translation.

An exemplary embodiment of the invention provides a device of the vacuum type with fixed box for dispensing seeds singly that makes it possible, in at least one embodiment, to optimize the dispensing of the seeds.

In particular, an embodiment ensures that the seeds are properly held in the reservoir.

An embodiment efficiently releases the seeds when they are ejected towards the ground.

At least one embodiment is little subject to the phenomenon of wear and tear.

At least one embodiment facilitates maintenance of the device.

At least one embodiment makes it possible to control the friction torque between the discs and the means providing tight sealing.

Although the present disclosure has been described with reference to one or more examples, workers skilled in the art will recognize that changes may be made in form and detail without departing from the scope of the disclosure and/or the appended claims.

The invention claimed is:

1. A device for dispensing seeds singly, said device comprising:
 a drum to be fixedly attached to a planter;
 a lid that is fixed relative to said drum and defines an internal cavity with said drum;
 a drive shaft mounted so as to be rotationally mobile through said drum;
 a dispensing disc traversed by a plurality of seed suction holes made evenly on a periphery of said dispensing disc, said dispensing disc being mounted so as to be fixedly attached in rotation on said drive shaft inside said cavity so that, with said drum and said lid, said dispensing disc demarcates a vacuum chamber and a seed reservoir therein, a portion of a zone of said dispensing disc traversed by said holes extending outside said vacuum chamber;
 a seal, which seals the vacuum chamber between said drum and said dispensing disc, wherein the seal comprises a friction insert mounted so as to be immobile in rotation relative to said drum against the periphery of said dispensing disc, and an elastic seal mounted so as to be immobile in rotation between said drum and said friction insert, said elastic seal maintaining said friction insert in a position of leaning against said dispensing disc.

2. The device according to claim 1, wherein said elastic seal has a stiffness such that said elastic seal exerts a force on said friction insert ranging from 10 N to 100 N per linear meter for compression travel of one millimeter for the elastic seal.

3. The device according to claim 1, wherein said friction insert comprises an external peripheral portion in contact with said elastic seal and an internal peripheral portion, said external peripheral portion being capable of getting axially deformed relative to said internal peripheral portion.

4. The device according to claim 1, wherein said drive shaft comprises a shoulder situated inside said vacuum chamber, said dispensing disc leaning against said shoulder.

5. The device according to claim 1, wherein said elastic seal belongs to the group consisting of:
lip seals;
hollow seals;
solid seals.

6. The device according to claim 1, wherein that said elastic seal is fixedly attached to said drum.

7. The device according to claim 1, wherein said elastic seal is fixedly attached to said friction insert.

8. The device according to claim 7, wherein said elastic seal is fixedly attached to said friction insert by glueing, overmolding or being clipped into a groove of a complementary shape made in said friction insert.

9. A planting element comprising:
a device for dispensing seeds singly, said device comprising:
a drum to be fixedly attached to a planter;
a lid that is fixed relative to said drum and defines an internal cavity with said drum;
a drive shaft mounted so as to be rotationally mobile through said drum;
a dispensing disc traversed by a plurality of seed suction holes made evenly on a periphery of said dispensing disc, said dispensing disc being mounted so as to be fixedly attached in rotation on said drive shaft inside said cavity so that, with said drum and said lid, said dispensing disc demarcates a vacuum chamber and a seed reservoir therein, a portion of a zone of said dispensing disc traversed by said holes extending outside said vacuum chamber;
a seal, which seals the vacuum chamber between said drum and said dispensing disc, wherein the seal comprises a friction insert mounted so as to be immobile in rotation relative to said drum against the periphery of said dispensing disc, and an elastic seal mounted so as to be immobile in rotation between said drum and said friction insert, said elastic seal maintaining said friction insert in a position of leaning against said dispensing disc.

10. An apparatus comprising:
a planter; and
a device for dispensing seeds singly, said device comprising:
a drum fixedly attached to the planter;
a lid that is fixed relative to said drum and defines an internal cavity with said drum;
a drive shaft mounted so as to be rotationally mobile through said drum;
a dispensing disc traversed by a plurality of seed suction holes made evenly on a periphery of said dispensing disc, said dispensing disc being mounted so as to be fixedly attached in rotation on said drive shaft inside said cavity so that, with said drum and said lid, said dispensing disc demarcates a vacuum chamber and a seed reservoir therein, a portion of a zone of said dispensing disc traversed by said holes extending outside said vacuum chamber; and
a seal, which seals the vacuum chamber between said drum and said dispensing disc, wherein the seal comprises a friction insert mounted so as to be immobile in rotation relative to said drum against the periphery of said dispensing disc, and an elastic seal mounted so as to be immobile in rotation between said drum and said friction insert, said elastic seal maintaining said friction insert in a position of leaning against said dispensing disc.

* * * * *